Feb. 9, 1960 W. A. FIEDLER ET AL 2,924,148
INDUCED PITCH LAUNCHER DEVICE
Filed Nov. 29, 1955 2 Sheets-Sheet 1

INVENTORS
WILLY A. FIEDLER
E. QUIMBY SMITH
BY
ATTORNEYS

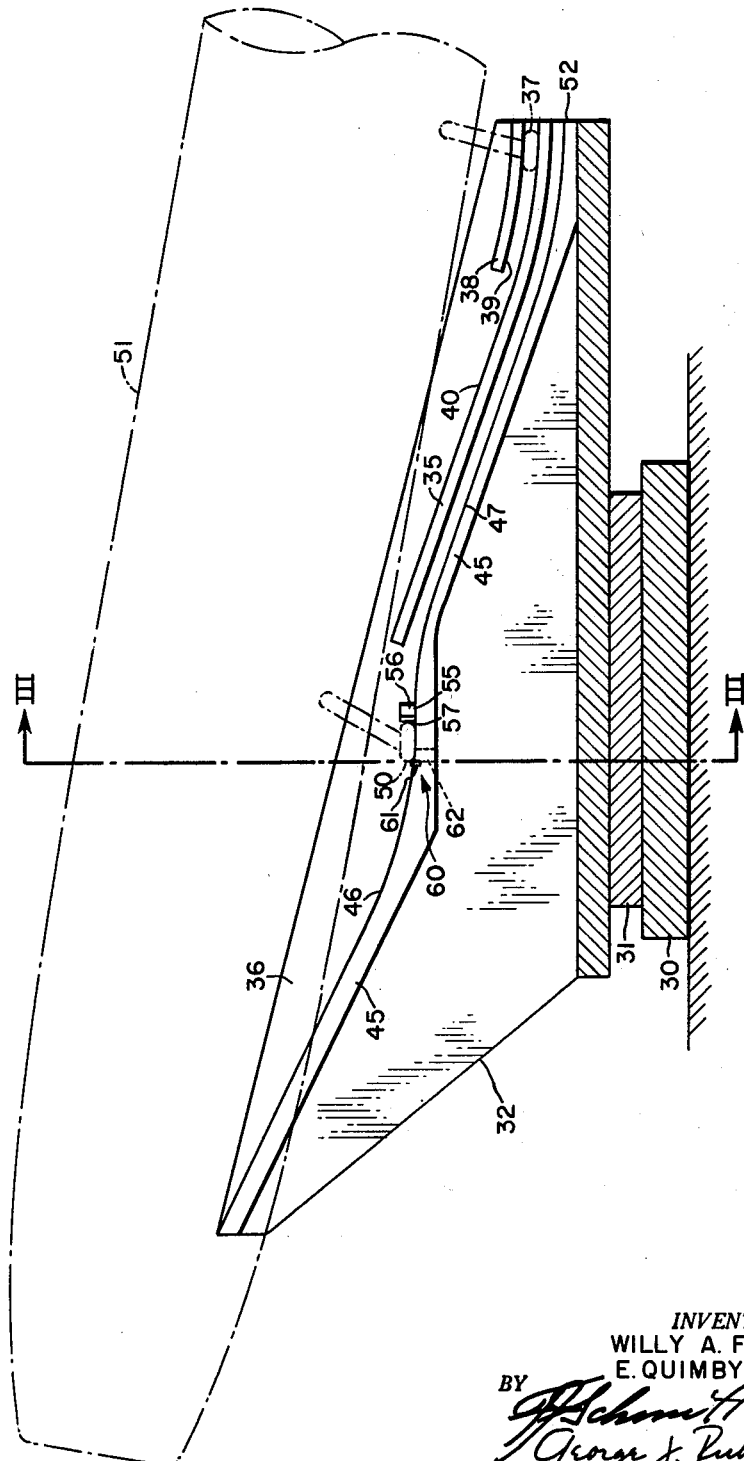

2,924,148
INDUCED PITCH LAUNCHER DEVICE

Willy A. Fiedler and E Quimby Smith, Oxnard, Calif., assignors to the United States of America as represented by the Secretary of the Navy Application November 29, 1955, Serial No. 549,891

3 Claims. (Cl. 89—1.7)

(Granted under Title 35, U.S. Code (1952), sec. 266)

The invention described herein may be manufactured and used by or for the Government of the United States of America for governmental purposes without the payment of any royalties thereon or therefor.

The present invention relates to a launcher device and more particularly to an induced pitch launcher device which employs a guide means so constructed and arranged as to produce a pitch rate in an aircraft such that the aircraft will continue to change its pitch attitude after leaving the invention device.

The present invention may be utilized for launching any type of aircraft but is especially adapted for use in launching guided missiles from naval ships. The invention device is particularly efficacious for launching relatively large guided missiles wherein it may be desired to launch the missile such that it has a pitch angle of approximately 30 degrees or greater upon leaving the launcher. Prior art devices for launching such missiles utilize substantially planar guide rails, and the missiles are placed on the launchers while in horizontal position, whereupon the launcher is subsequently elevated to a battery angle of approximately 30 degrees. The mechanism required to elevate prior art launcher devices into operative position is excessively bulky and complex, and therefore not suitable for use aboard ship where the large space required for such launchers is prohibitive and where maintenance problems must be kept at a minimum. Moreover, when such prior art devices are in operative position, their structural rigidity is at a minimum and in shipboard installations, the dynamic loads produced by the ship's motion are at a maximum. Such prior art devices have an excessive longitudinal dimension and consequently are not adapted to be trained in a desired direction but are fixed relative to the ship thereby requiring that the ship itself be turned in order to train the launcher in the proper direction. In addition, when prior art devices are utilized wherein the missile in battery position is inclined approximately 30 degrees to the deck of the ship, the force of the jet blast impinging on the deck is of considerable magnitude and presents a serious problem.

The present invention utilizes a new concept wherein the initial angle of the missile with respect to the horizontal when the missile is in battery position is reduced, and the launcher is provided with a novel guide means which causes the pitch attitude of the missile to increase during most of the booster phase of its flight. As the motors of the missile move the missile along the novel guide means of the invention device, a rotational energy is induced into the missile such that after the missile leaves the launcher the pitch attitude thereof increases to a level commensurate with that produced by a conventional launcher.

The phrase "positive pitch rate" as used in this application is intended to denote a pitch rate in the aircraft wherein the aircraft tends to increase its pitch attitude. The novelty of this invention lies in producing such a positive pitch rate in an aircraft as it leaves the launcher whereby the pitch attitude will continue to increase to an optimum value. It is apparent, however, that if the induced angular movement of the aircraft were allowed to continually increase, the aircraft may increase its angle of attack to the point where it would be in stall condition. It therefore may become necessary to provide an arrangement wherein an aerodynamic moment is produced on the aircraft which counteracts the induced angular momentum such that the missile will have the proper pitch attitude at the end of the booster phase of flight. This may be accomplished in a number of ways, but the method considered most desirable is that of prealigning the booster motor thrust line above the missile center of gravity thereby producing a force on the missile opposing the positive pitch rate induced by the novel launcher. In this manner, the aircraft at the end of the booster phase of flight is in the proper pitch attitude at a sufficient altitude, and will have attained the necessary end speed.

Since the guide means of the invention launcher device are fixed relative to the body means thereof, there is no necessity for elevating any of the components of the device and the missile when in battery position has a low center of gravity which favorably affects the meta center height of smaller ships and especially of submarines. The invention device is extremely adaptable for use either aboard ship or shore, and it may be readily trained in a desired direction without altering the position of the ship on which it is mounted. Furthermore, the missile when in battery position is at an angle of approximately 10 degrees to the deck of the aircraft whereby the force of the jet blast impinging on the deck of the ship will be reduced by as much as 50% over that produced by prior art devices wherein the missile is at an angle of approximately 30 degrees of the deck when in battery position.

An object of the present invention is is the provision of a new and novel induced pitch launcher device which eliminates the necessity of elevating the launcher device after the missile has been placed in operative position thereon.

Another object is to provide an induced pitch launcher device wherein the aircraft has a lower battery position than in prior art launchers, and wherein the force of the jet blast impinging on the deck of a ship is considerably reduced.

A further object is to provide an induced pitch launcher device which is adaptable for use in a number of different installations and which may be readily trained without altering the position of the ship upon which it is mounted.

Yet another object is to provide an induced pitch launcher device which is extremely strong and rigid in construction, yet which is relatively simple in construction with a minimum of size and weight.

Other objects and many of the attendant advantages of this invention will be readily appreciated as the same becomes better understood by reference to the following detailed description when considered in connection with the accompanying drawings wherein:

Fig. 2 is an enlarged longitudinal section illustrating a preferred embodiment of the invention.

Figure 1:
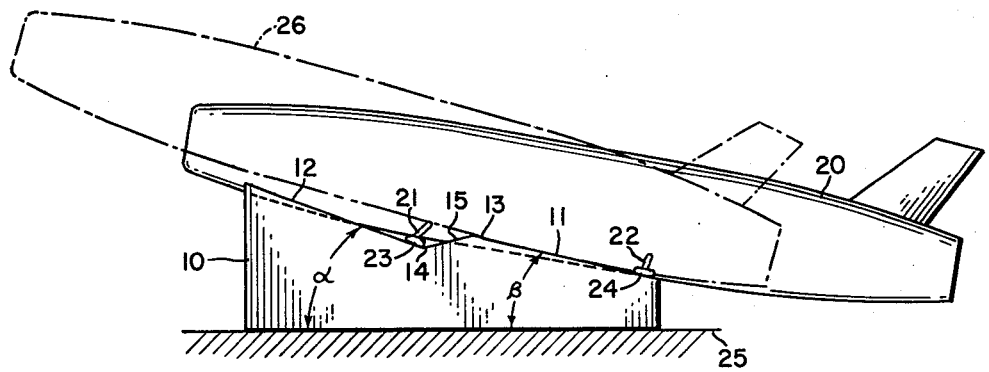
Fig. 1 is a somewhat schematic view of the device illustrating the principle of operation.

Referring now to Fig. 1, there is shown a fixed base means 10 having two spaced parallel rear guide means or rails 11 only one of which is shown and two spaced parallel forward guide means or rails 12 only one of which is shown. The forward end 13 of rails 11 is connected to the rear end 14 of rails 12 by a connecting member 15. It should be understood that the device is completely symmetrical and consequently it is only necessary to view one side thereof in order to understand the mode of operation of the device. The interior of the body means is hollowed out and the aircraft 20 illustrated as a guided missile is supported between the spaced rails 11 and 12.

Missile 20 is provided with a forward pair of support members 21 only one of which is shown, the support members comprising elongated metallic members secured to the lower surface of the missile symmetrically on opposite sides of the longitudinal axis of the missile. A similar pair of support members 22 only one of which is shown are pivotally secured to the missile aft of support members 21. Conventional pairs of metallic slippers 23 and 24 formed for example of brass are pivotally connected to the lower ends of each of support members 21, 22 respectively and are adapted to rest upon and slide along rails 11 and 12. The method of placing the missile in battery position as shown in full lines in Fig. 1 will be described with reference to Fig. 2, but it may be seen that when the missile is in battery position, the forward pair of slippers rest upon the rear portions of rails 12 and the aft pair of slippers rest upon the rear portion of rails 11. That portion of the guide rails which supports the aircraft slippers when the aircraft is in battery position is designated the battery portion of the rails, and that portion of the rails which supports the slippers immediately prior to disengagement of the aircraft from the invention device is designated the exit portion of the rails.

Rails 12 form an angle alpha with respect to a fixed horizontal support means 25 and rails 11 form an angle beta with respect to the support means. In accordance with the invention, angle alpha must be greater than angle beta, and the difference between these two angles will be governed by the amount of positive pitch which it is desired to induce in a launched aircraft. It is apparent that upon actuation of the motors of missile 20, the missile will move forward along the rails such that the forward slippers and consequently the forward portion of the missile will be elevated at a greater rate than the aft slippers and the aft portion of the missile. Phantom line 26 illustrates the position of the missile immediately prior to disengagement from the launcher; and it is apparent that as the missile moves forward along the launcher, it rotates in a clockwise direction thereby increasing the pitch attitude and inducing an angular momentum in the missile. After disengagement from the launcher, the missile will continue to increase its pitch attitude due to the positive pitch rate induced therein during the launching operation, and the pitch attitude will continue to increase until it is counteracted by the aerodynamic moment produced by the booster motors which are so mounted that their direction of thrust is above the center of gravity of the missile. In this manner, the missile is in the same pitch attitude at the end of the launch phase of its flight as is obtained when utilizing prior art launchers wherein the launching rails are substantially planar and parallel to one another thereby requiring that they be initially elevated to provide the missile with the required pitch attitude at the end of its launch phase of flight.

The guide rails 11 and 12 as shown in Fig. 1 have been illustrated as being substantially straight surfaces. However, it is considered preferable that these surfaces be curved such that the greater portion of the angular displacement of the missile occurs during the initial phase of the missile's movement whereby the forces applied to the missile are decreased and accordingly any possible damage due to the equipment therein will be diminished. The exact curvature of the guide rails will be governed in accordance with design considerations, but in each case it is necessary that the vertical distance between the battery portion and the exit portion of the forward rails be greater than the vertical distance between the corresponding portions of the rear guide rails whereby the forward portion of the aircraft will be elevated more than the rear portion of the aircraft as the aircraft moves along the guide rails thereby inducing a positive pitch rate in the aircraft.

Figure 3:
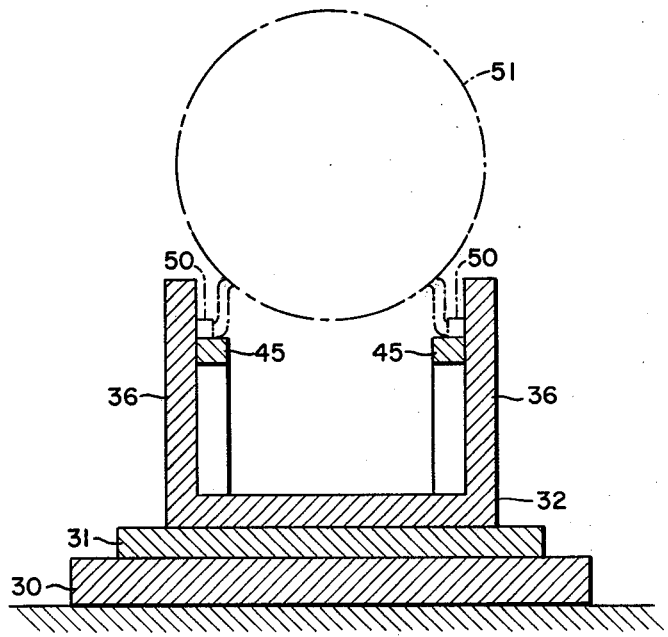
Fig. 3 is a cross-sectional view taken along the line III—III in Fig. 2, looking in the direction of the arrows, and showing in phantom lines an aircraft in battery position on the launcher.

Referring now to Figs. 2 and 3, there is shown a preferred embodiment of the invention including a base means 30 which is suitably fixed for example to the deck of a naval ship. A mount 31 is rotatably supported upon base 30 in a manner similar to that of conventional gun mounts, and body means 32 is suitably fixed to mount 31. Conventional driving and control means may be utilized for training the body means in the proper direction for launching an aircraft in a desired direction. As seen most clearly in Fig. 3, the invention device is symmetrical, the opposite side walls 36 of the body means being similar to one another and in spaced parallel relationship. An elongated guide means or rail 35 is fixed to and projects laterally inward from each side wall 36 of the body means, and phantom line 37 in Fig. 2 represents the rear slipper of an aircraft in battery position. An elongated guide 38 is also fixed to and projects laterally inward from each side wall 36, and the lower surface 39 thereof is spaced from and is complementary to the upper surface 40 of rail 35. Surfaces 39 and 40 are sufficiently spaced to accommodate slipper 37 and engage the upper and lower surfaces thereof respectively whereby the rear slippers of the aircraft are positively restricted in their motion during the initial movement of the aircraft. After initial movement of the aircraft, it is no longer necessary to provide a guiding restraint on the upper surface of the slippers since the thrust of the booster motors exerts a component tending to force the slippers against the upper surface 40 of rails 35. A second guide means or rail 45 is fixed to and projects laterally inward from each side wall 36, and has a first curved portion 46 and a second curved portion 47. Phantom line 50 represents a forward slipper of an aircraft in battery position relative to the device, the aircraft being indicated by phantom line 51 in Figs. 2 and 3.

Mounting the missile upon the launcher device is accomplished in a simple manner by originally mounting the missile on a small wheeled dolly or the like whereby the missile may be easily handled. The dolly is then maneuvered to a position adjacent the rear end 52 of the launcher, and the front slippers of the aircraft are placed upon the upper surface 47 of rail 45. The missile is then moved in a forward direction by a suitable means such that the forward slippers of the aircraft ride up along surface 47 until the front slipper reaches surface 46 of rail 45 whereupon the front and rear slippers simultaneously move into the battery positions as illustrated in the drawing.

A conventional spring biased detent 55 is mounted in wall 36 and is normally biased in an outward direction, the detent being provided with a cam surface 56 in a well known manner whereby as the forward slippers move along rail 45 and strike surface 56, the detent will be biased inwardly. As the rear portion of the slipper clears the detent and reaches battery position, the detent means will be biased outwardly and the flat lateral surface 57 of the detent will engage the rear portion of the forward slipper adjacent thereto such that the aircraft may not move in an aft direction relative to the launcher device. A suitable handle may be provided exteriorly of the body means for selectively disengaging the detent from the slipper should it be desired to move the missile in an aft direction, as for example in the case of a misfire or malfunction when it is desired to remove the missile from the launcher device.

A holdback means indicated generally by reference numeral 60 provides a predetermined restraining force on the missile such that the missile will not move forwardly along the rails of the launcher device until the motors of the missile have developed a predetermined amount of thrust, whereupon the holdback means will permit the missile to be moved in a forward direction. Any suitable holdback means may be utilized for this purpose, but it is considered preferable due to simplicity and reliability to provide a hardened steel cutting member 61 which is fixed to rail 45 and projects in an upward direction such that it engages the forward edge of the front slippers. An opening 62 is provided through rail 45 adjacent member 61 and the holdback member will restrain the forward slipper thereagainst until a predetermined amount of thrust is developed by the missile motors, whereupon the missile will move forward and a small groove will be cut longitudinally through the soft brass forward slipper of the aircraft as the aircraft moves forwardly, the brass shaving produced thereby dropping through opening 62 to the bottom of launcher device. Although it is necessary to provide only a single detent means and holdback means, these means may be duplicated on opposite sides of the device if desired.

As previously stated, the guide rails may be of any desired configuration as long as the vertical distance between the battery portion and the exit portion of the forward rails is greater than the vertical distance between the battery portion and the exit portion of the rear rails. As shown in Fig. 2, the initial curved portions of the upper surfaces 40 and 46 of rails 35 and 45 respectively are formed as a portion of a logarithmic spiral, and the exit portions of each of the rails are substantially straight. This arrangement produces a positive pitch rate in the aircraft and at the same time minimizes the shock loads applied to the aircraft. As a further modification, it may also be desirable to provide the outer ends of the exit portions of each of the rails with a slightly convex curvature which will alleviate to a certain extent the so-called step-off shock as the aircraft becomes disengaged from the launcher and assumes an airborne condition. In certain shipboard applications, it may be desirable to incorporate the functions of a dolly in the launcher device by mounting the body means upon suitable wheels such that the entire launcher device may be moved into a desired position. Additionally, a winch may be mounted upon the body means for pulling the aircraft into battery position.

It is apparent from the foregoing that there is provided a new and novel induced pitch launcher device wherein the necessity of elevating the launching device is entirely eliminated. A missile has a lower battery portion in the launcher device thereby substantially reducing the jet blast force which impinges upon the deck of a ship. The device is easily trainable, and is adaptable for use either on board ship or ashore. The invention device may be constructed so as to be extremely rigid and strong, and yet its size and weight are considerably less than that of prior art devices.

Obviously many modifications and variations of the present invention are possible in the light of the above teachings. It is therefore to be understood that within the scope of the appended claims the invention may be practiced otherwise than as specifically described.

We claim:
1. An induced pitch launcher device for aircraft which comprises a base means, body means movably mounted on said base means and having a forward and a rearward portion, a plurality of guide means rigidly supported by said body means, a forward end of a first one of said guide means being disposed forwardly of a forward end of a second one of said guide means, each of said guide means having a battery portion adapted to support an aircraft when in battery position relative to the device, each of said guide means also having an exit portion adapted to support the aircraft immediately prior to disengagement from said device each of said guide means having a positive inclination throughout its length between the respective battery and exit portions, the vertical distance between the battery portion and the exit portion of said first guide means being greater than the vertical distance between the battery portion and the exit portion of said second guide means, said exit portion of the forward guide means having a greater inclination than the exit portion of the second guide means, detent means positioned adjacent the battery portion of said first guide means for maintaining the aircraft in battery position, and holdback means positioned adjacent the battery portion of said first guide means for applying a predetermined restraining force to the aircraft.

2. An induced pitch launcher for aircraft which comprises a body means, two pairs of guide rails rigidly supported on said body means, one pair of rails being disposed forward of the second pair of rails, each guide rail having a battery portion capable of supporting an aircraft when in battery position relative to the launcher and having an exit portion adapted to support the aircraft immediately prior to disengagement from said launcher, said forward pair of rails extending for substantially the length of the body means, the respective battery portion of the forward rails being disposed at an intermediate position, a portion of said forward rails aft of the respective battery portion lying beneath and vertically spaced from the second pair of rails, the exit portion of the forward pair of rails having a greater positive inclination with a horizontal plane than the exit portion of the second pair of rails whereby a positive pitch rate is induced into the launched aircraft.

3. An induced pitch launcher device for aircraft which comprises a body means, a plurality of guide means rigidly supported by said body means, a forward end of one of said guide means terminating forwardly of a forward end of a second of said guide means, each of said guide means having a battery portion adapted to support an aircraft when in battery position relative to the device, each of said guide means also having an exit portion at a forward end adapted to support the aircraft immediately prior to disengagement from said device, each of said guide means having a positive inclination throughout its length between the respective battery portion and exit portion, the vertical distance between battery portion and the exit portion of the forward guide means being greater than the vertical distance between the battery portion and the exit portion of the second one of said guide means, said exit portion of the said forward guide means having a greater positive inclination than the exit portion of the second guide means, whereby a positive pitch rate is induced in the launcher aircraft.

References Cited in the file of this patent
UNITED STATES PATENTS

| | | |
|---|---|---|
| 1,706,065 | Jenkins | Mar. 19, 1920 |
| 2,330,733 | Plaszy | Sept. 28, 1943 |
| 2,604,014 | Walker et al. | July 22, 1952 |
| 2,729,406 | Bush | Jan. 3, 1956 |
| 2,735,391 | Buschers | Feb. 21, 1956 |
| 2,776,622 | Robert | Jan. 8, 1957 |
| 2,826,960 | Schiavi | Mar. 18, 1958 |

FOREIGN PATENTS

| | | |
|---|---|---|
| 25,326 | Great Britain | 1894 |